Figure 1:
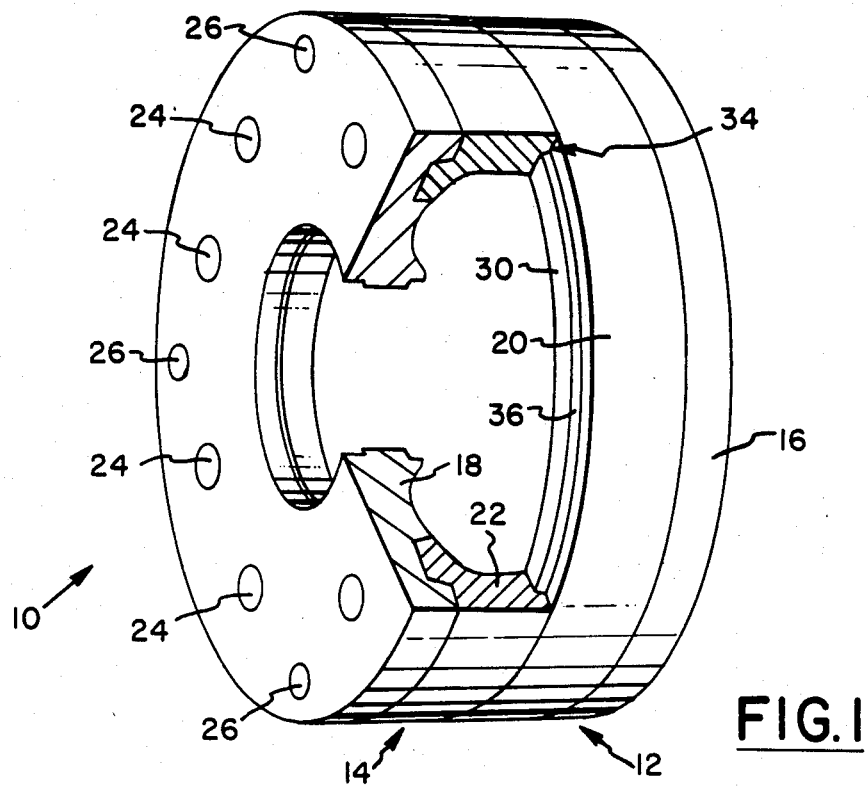

United States Patent [19]

Hill et al.

[11] Patent Number: 4,616,986
[45] Date of Patent: Oct. 14, 1986

[54] LIGHT WEIGHT TIRE MOLD FOR TWO PIECE TREAD RING

[75] Inventors: Howard L. Hill, Keyser, W. Va.; Gary L. Gillum, Cumberland, Md.

[73] Assignee: The Goodyear Tire & Rubber Company, Akron, Ohio

[21] Appl. No.: 662,654

[22] Filed: Oct. 19, 1984

[51] Int. Cl.⁴ .............................................. B29C 33/00
[52] U.S. Cl. ........................................ 425/32; 425/35; 425/47
[58] Field of Search ...................... 425/32, 35, 46, 47, 425/54; 249/56, 57

[56] References Cited

U.S. PATENT DOCUMENTS

| | | | |
|---|---|---|---|
| 1,615,473 | 1/1927 | Midgley | 425/47 |
| 2,266,720 | 12/1941 | Chambers | 425/47 |
| 3,121,947 | 2/1964 | Knox | 425/47 |
| 3,486,198 | 12/1969 | Lewis | 425/36 |
| 4,152,388 | 5/1979 | Grawey et al. | 425/47 |

FOREIGN PATENT DOCUMENTS

| | | | |
|---|---|---|---|
| 564553 | 6/1957 | Italy | 425/47 |
| 241891 | 11/1926 | United Kingdom | 425/47 |

*Primary Examiner*—Jay H. Woo
*Assistant Examiner*—James C. Housel
*Attorney, Agent, or Firm*—T. P. Lewandowski

[57] ABSTRACT

A mold for molding tires having complimentary sidewall rings and mating with a split tread ring having two halves each being a single cast piece having the tire tread pattern indicia on the inside thereof and extending from the inside tread pattern all the way to the outside diameter of the mold.

9 Claims, 2 Drawing Figures

LIGHT WEIGHT TIRE MOLD FOR TWO PIECE TREAD RING

The present invention relates to molds for creating elastomeric products and more particularly to molds for tires. It has long been known to mold tires in a two-piece mold wherein each piece of the mold was a forging encapsulating one-half of the tread portion of the tire to be molded and one of its sidewalls. Traditionally the two piece mold incorporated an insert in the form of a cast tread ring, which tread ring insert carried the tread pattern indicia for the tire to be molded. The use of the tread ring insert allowed the same mold to be used with a number of different tread patterns. The sidewall pattern and indicia, however, had to remain the same in the two piece mold.

With the advent of raised lettering on the outer sidewall of tires the three piece sidewall ring type mold was developed to facilitate interchangeability of the thin forging for the outer tire sidewall mold half. The thin forging had a shoulder mating line with a heavy forging similar to that for the two piece mold half extending over the tread portion of the tire. The other half of the mold remained the same as the heavy forging of the two piece mold. The three piece mold required a tread ring insert for flexibility in changing the tread pattern, as in the two piece mold, and to accomodate the insert the heavy forging portion of the half of the mold used for the outer sidewall of the tire had a ribbed offset for mating in a groove of the thin forging of the sidewall ring.

Another variation of the two piece mold was one having the introduction of a sidewall ring insert into the lower portion of a heavy forging sidewall ring which sidewall ring insert could be interchanged for flexibility and change of design on the sidewall.

The final step was to combine the last two mold approaches to incorporate the sidewall ring within the thin forging for the sidewall of the three piece mold.

Early on in the development of tire molds a mold with two splits to provide mold parting lines at each shoulder of the tire was developed using a mid-ring in conjunction with a tread ring insert to enclose the entire width of the tire tread. The mid ring approach presented problems in removal of the tire from the mold. This concept is generally considered as unacceptable for use with present day tires.

The above molds which started with heavy forgings to accomodate the high temperatures and high pressures of tire molding and curing, and have in sequential steps been subsequently modified to become more flexible in their use, at the same time have become complicated and cumbersome with a number of heavy parts. The substantial increase over the first two piece mold in the number of parts for the molds have substantially increased the requirement for machining on the molds thereby also increasing their cost.

The present invention is directed at a mold for overcoming the above problems by a dramatic turnaround in the above sequence in refinement of mold designs. The mold of the present invention provides the flexibility for tread and sidewall design changes while reducing the number of mold pieces over the above mold with the use of a thin lightweight member for the tire outer sidewall portion of the mold. The mold has the advantage of greater pricing flexibility because of the number of choices of materials available for making its sidewall portion. Less machining and handling of fewer pieces as well as simpler castings are additional cost advantages. Other advantages are a lighter weight mold because of a less material requirement overall for making the mold resulting in the overall size of the mold being reduced giving it the further advantage of being useful in smaller presses.

A mold in accordance with the present invention has in a two piece mold for tires, sidewall rings and a split tread ring with a tread pattern on the inside thereof, each half of the tread ring being a single piece and extending from the outside diameter of the mold to the innermost inside diameter of the mold tread pattern, the sidewall rings engageably mating with the tread ring which alone forms the parting line for the mold.

The present invention also embodies a tire mold with a tread pattern therein, first and second sidewall rings of the mold, inner and outer diameters on the rings. Inner and outer faces on the rings extending between the inner and outer diameters. The inner faces on the rings are opposed to each other and each face has a circular groove thereon also opposing each other. A split tread ring is located between the rings having inner and outer diameter on each half of the tread ring. The tread ring halves are a single piece and the tread ring outer diameter matches the outer diameter of the sidewall rings. The tread ring inner diameter corresponds to the innermost diameter of the mold tread pattern. Outer faces on the tread ring extend between the tread ring inner and outer diameters for mating with the inner faces on the sidewall rings. Inner faces on tread ring extend between the tread ring inner and outer diameters for mating with each other to alone form the mold parting line, and an annular offset in the tread ring inner faces enhances alignment of the mold when the inner faces mate. A circular rib on the tread ring outer faces mates with the circular groove on the sidewall rings and inner contact surfaces on the rib and in the grooves align the tread ring relative to the sidewall ring.

Further, this innovation envisages a two piece mold for tire vulcanizing presses, said mold having sidewall rings each having means for molding a tire sidewall and having a thickness to withstand vulcanizing press pressure and a split tread ring with a tread pattern on the inside thereof and at least one part of the split tread ring being a single piece which extends from an outside diameter of the mold to the innermost inside diameter of the mold tread pattern together with at least one sidewall ring engageably mating with, and extending along an outer face of, the tread ring half which forms the parting line for the mold.

Figure 2:
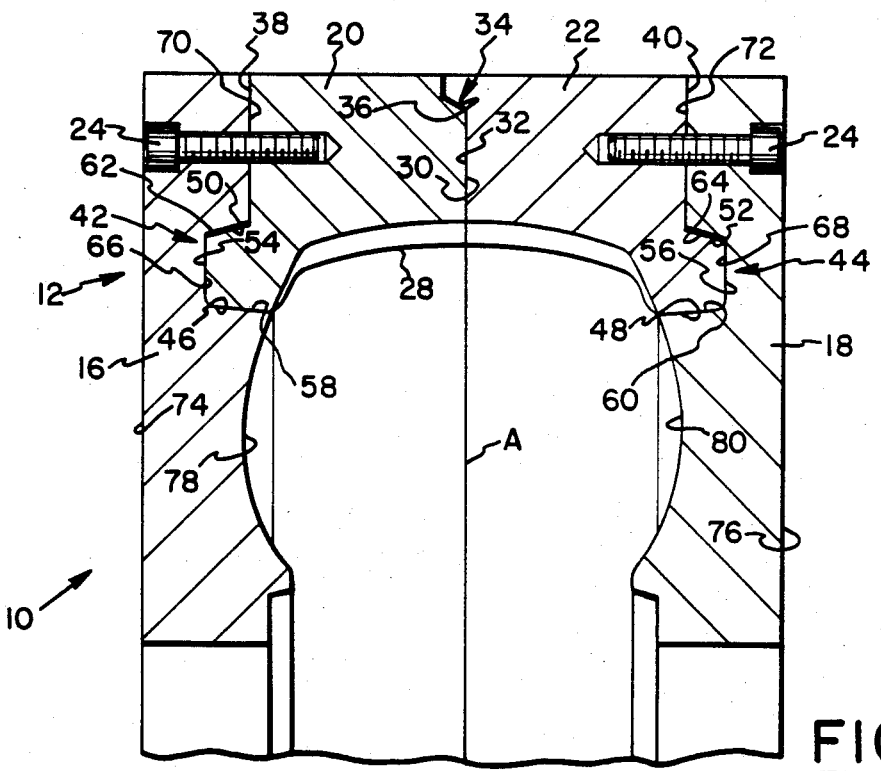

The above advantages of the invention will become readily apparent to one skilled in the art from reading the following detailed description of an embodiment of the invention when considered in the light of the accompanying drawings, in which;

FIG. 1 illustrates a tire mold embodying the present invention as viewed in perspective with a portion thereof broken away to show further details, and FIG. 2 is a fragmentary cross-sectional view of the tire mold in FIG. 1.

Referring to FIGS. 1 and 2 of the drawings, a tire mold 10 of the type with which this invention is concerned consists of a pair of mold halves 12 and 14 being male and female respectively. Each mold half has a sidewall ring 16 and 18, male and female respectively, and one-half of a split tread ring, 20 and 22 also male and female respectively. The two mold halves 12 and 14 are parted on a center parting line 'A' on which the mold 10 is opened to release the product molded therein. The split tread ring halves 20 and 22 are connected by a series of equally spaced bolts which may be screwed into the tapped and counter sunk bores 24. In a similar manner the sidewall rings 16 and 18 may be aligned with the split tread ring halves 20 and 22 using dowel pins, not illustrated, in locations between the two pieces similar to those illustrated for the bolt bores 24. In a like manner the mold halves 12 and 14 can be attached to a curing press using a series of press drillings 26.

The split tread ring halves 20 and 22 contain the tread pattern for the tire to be molded on the inside of the tread ring. The line 28 depicts the innermost portion of the tread pattern on the inside diameter of the tread ring. Each half 20, 22 of the tread ring can be seen to be a solid piece extending from the inside diameter of the tread ring to the outside diameter of the mold 10. Casting of the tread ring halves 20 and 22 has eliminated the tread insert used with the above conventional molds thereby simplifying the mold 10 construction.

On the other hand the tread ring halves 20 and 22 maintain the thickness of the conventional two piece mold heavy forgings to accomodate bolting to the sidewall rings 16 and 18 but eliminate the thickness of the tread ring insert thereby allowing the overall mold 10 size to be reduced. In addition to the size reduction there is no longer a requirement for machining of either mold half 20 or 22 in order to receive the tread ring insert, and the material previously machined from the two mold halves 12 and 14 and thrown away is no longer wasted. Preferably the tread ring is cast as an expeditious way to provide it with the tire tread pattern. Also within the scope of this invention are other single piece tread rings which, for example, having simple tread patterns could have their tread patterns cut into their surface rather than cast in. Preferably the split tread ring is made of cast aluminum and still more particularly of an aluminum alloy such as 514 alloy.

The two halves 20 and 22 of the split tread ring each have interfaces 30 and 32 extending from the innermost diameter of the tread ring to its outermost diameter which matches the outer diameter of the mold 10. The innerfaces 30, 32 have an offset 34 at the outer diameter of the tread ring which facilitates alignment of the two halves 20 and 22 as the mold 10 is closed. An inclined surface 36 on the offset 34 is provided to facilitate quick opening of the two mold halves 13 and 14 when the mold 10 is opened.

The split tread ring has outer faces 38 and 40 extending from its outside diameter to its inside diameter and interrupted by ribs 42 and 44 protuding from the innermost end of the outer faces 38 and 40.

The ribs 42 and 44 extend contact surface 46 and 48 to thereby increase the load bearing surface between the internal diameter of the tread ring and the sidewall rings 16 and 18, respectively. Both the contact surfaces 46 and 48 and outer rib surfaces 50 and 52 are inclined in a manner similar to the inclined surface 36 of the offset 34 to provide quick removal of the tread ring halves 20 and 22 upon removal of bolts from the bores 24. Outer faces 54 and 56 complete the configuration of the ribs 42 and 44. While the contact surfaces 46 and 48 form an interference fit with the sidewall rings 16 and 18 to prevent flash from occuring at the mating line between the tread ring and the sidewall ring 16 and 18 clearance is left between the outer rib surfaces 50, 52 and the sidewall ring 16 and 18 to accomodate differential expansion upon heating of the mold 10.

The sidewall rings 16 and 18 have mating surfaces to those of the rib on the tread ring in sidewall contact surfaces 58 and 60, sidewall ring outer surfaces 62 and 64, and outer faces 66 and 68 all of which form an accomodating groove in the respective sidewall rings 16 and 18 for receiving the tread ring ribs 42 and 44, respectively.

The sidewall rings 16 and 18 further have innerfaces 70 and 72 extending from the mold outer diameter to the mold inner diamater, and accomodating therein the above described groove. The sidewall rings 16 and 18 have their boundaries completed by outer faces 74 and 76 extending between the mold outside diameter and its inside diameter. The mold inner faces 70 and 72 further accomodate the sidewall configuring surfaces 78 and 80 to complete the outer shape of the tire to be molded therein. The inner portion of the tire is molded in a conventional manner such as with the use of an expandable bladder.

The sidewall rings 16 and 18, being thin sections in comparison to the prior art two-piece mold forgings, can preferably be made of plate material rather than cast or forged. However, even if cast or forged the lighter sections permit larger rings to be manufactured and all three type sidewall rings permit flexibility in handling changeover of sidewall configurations as well as easier machining. Preferably the plate or forging material would be 2618-T61 aluminum while the casting would preferably be almag 35.

While the flexibility of the sidewall rings 16 and 18 provide for easier and quicker changeover it is not beyond the scope of the present invention to incorporate therein sidewall ring inserts as discussed above with respect to the conventional two piece mold.

In accordance with the provisions of the patent statutes, the principle and mode of operation of the device have been explained and what is considered to represent its best embodiment has been illustrated and described. It should however, be understood that the invention may be practiced otherwise than as specifically illustrated and described without departing from its spirit or scope.

What is claimed is:

1. A two piece tire vulcanizing press mold for use in a tire press, said mold having sidewall rings each having means for molding a tire sidewall and having a thickness to withstand the press pressure and a split tread ring with a tread pattern inside thereof, at least one part of said tread ring being a single piece and extending from an outside diameter of the mold to the innermost inside diameter of the mold tread pattern, at least one sidewall ring engageably mating with, and extending along an outer face of said at least one half tread ring which alone forms the parting line for the mold.

2. A tire press mold with a tread pattern therein, first and second sidewall rings of said mold, inner and outer diameters on said rings, inner and outer faces on said rings extending between said inner and outer diameters, said inner faces on said rings opposed to each other and each face having a circular groove thereon also opposing each other, a split tread ring located between said rings, inner and outer diameter on each half of said tread ring, said tread ring halves each being a single piece and said tread ring outer diameter matching the outer diameter of said sidewall rings, said tread ring inner diameter corresponding to the innermost diameter of the mold tread pattern, outer faces on said tread ring extending between said tread ring inner and outer diameters for mating with said inner faces of said sidewall rings, inner faces on said tread ring extending between said tread ring inner and outer diameters for mating with each other to alone form the mold parting line, and annular offset in the tread ring inner faces for enhancing alignment of the mold when the inner faces mate, a circular rib on said tread ring outer faces for mating with said circular groove on said sidewall rings, inner contact surfaces on said rib and in said groove for aligning said tread ring relative to said sidewall ring.

3. The mold defined in claim 2 wherein said rib and groove inner contact surfaces are inclined to a plane passing perpendicularly through the mold parting line.

4. The mold defined in claim 2 including an outer surface on said rib of said tread ring located to provide clearance between said outer rib surface and the groove on said sidewall ring.

5. The mold defined in claim 4 wherein said outer rib surface is inclined to form an angle other than 90° with the mold parting line.

6. The mold defined in claims 1, 2, 3, 4 or 5 wherein said sidewall rings are made of aluminum plate.

7. The mold defined in claims 1, 2, 3, 4 or 5 wherein said tread ring is a casting.

8. The mold defined in claims 1, 2, 3, 4 or 5 wherein said tread ring width extends beyond the mold tread width.

9. The mold defined in claims 1, 2, 3, 4 or 5 wherein said sidewall ring has no portion thereof extending into the tread portion of the mold.

* * * * *